US006950427B1

(12) United States Patent
Zinin

(10) Patent No.: US 6,950,427 B1
(45) Date of Patent: Sep. 27, 2005

(54) TECHNIQUE FOR RESYNCHRONIZING LSDB IN OSPF AFTER A SOFTWARE RELOAD IN A NON-STOP FORWARDING INTERMEDIATE NODE OF A COMPUTER NETWORK

(75) Inventor: Alexey Dimitrievich Zinin, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 943 days.

(21) Appl. No.: 09/925,800

(22) Filed: Aug. 9, 2001

(51) Int. Cl.[7] ............................................. H04L 12/50
(52) U.S. Cl. .................................................... 370/386
(58) Field of Search ............................... 370/386, 241, 370/250, 254, 395–397, 218, 221, 242; 709/224, 709/238, 239, 229; 714/712; 713/201

(56) References Cited

U.S. PATENT DOCUMENTS

| 5,519,704 | A | 5/1996 | Farinacci et al. |
| 5,917,820 | A | 6/1999 | Rekhter |
| 5,964,841 | A | 10/1999 | Rekhter |
| 6,195,705 | B1 | 2/2001 | Leung |
| 6,473,421 | B1 | 10/2002 | Tappan |
| 6,728,214 | B1 * | 4/2004 | Hao et al. .................. 370/241 |
| 6,760,870 | B1 * | 7/2004 | Snyder et al. .............. 714/712 |
| 6,856,627 | B2 * | 2/2005 | Saleh et al. ................ 370/397 |
| 6,880,090 | B1 * | 4/2005 | Shawcross .................. 713/201 |

OTHER PUBLICATIONS

U.S. Appl. No. 09/925,827, Alex Dimitrievich Zinn.
Moy, J., OSPF Version 2, Request for Comments 2328, Network Working Group, Internet Engineering Task Force, 1998, pp. 1-244.
U.S. Appl. No. 09/971,298, Roy et al., filed Oct. 4, 2001.

* cited by examiner

Primary Examiner—Chi Pham
Assistant Examiner—Prenell Jones
(74) Attorney, Agent, or Firm—Cesari and McKenna, LLP

(57) ABSTRACT

A technique resynchronizes a link state database (LSDB) of a non-stop forwarding (NSF) router with the LSDB of a neighbor while maintaining an existing adjacency with the neighbor over a network interface of the router. According to the technique, the NSF router "pretends" to be a new router by establishing a "fake" adjacency with the neighbor over the same interface used for the existing adjacency with the neighbor. Believing that the fake adjacency is an adjacency established with the new router, the neighbor does not destroy the existing adjacency with the NSF router. This allows the NSF router to continue receiving and forwarding data traffic over the existing adjacency that was established before, e.g., reloading of routing protocol software on the router.

18 Claims, 8 Drawing Sheets

TECHNIQUE FOR RESYNCHRONIZING LSDB IN OSPF AFTER A SOFTWARE RELOAD IN A NON-STOP FORWARDING INTERMEDIATE NODE OF A COMPUTER NETWORK

CROSS-REFERENCE TO RELATED APPLICATIONS

The present invention is related to the following co-pending and commonly assigned U.S. patent application:
U.S. Patent Application Ser. No. (112025-0453) titled, Technique for Restoring Adjacencies in OSPF in a Non-Stop Forwarding Intermediate Node of a Computer Network,
which application was filed on even date herewith and is hereby incorporated by reference as though fully set forth herein.

FIELD OF THE INVENTION

This invention relates generally to computer networks, and more particularly, to resynchronization of a routing protocol database within a non-stop forwarding intermediate node of a computer network.

BACKGROUND OF THE INVENTION

A computer network is a geographically distributed collection of interconnected communication links and subnetworks for transporting data between nodes, such as computers. Many types of computer networks are available, with the types ranging from local area networks (LANs) to wide area networks (WANs). A LAN is an example of a subnetwork that provides relatively short distance communication among the interconnected stations, whereas a wide area network enables long distance communication over links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnect computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or an interior gateway) protocol. An example of such a protocol is the Open Shortest Path First (OSPF) routing protocol described in *Request for Comments (RFC) 2328, OSPF Version 2*, by J. Moy (1998). The OSPF protocol is based on link-state technology and, therefore, is hereinafter referred to as a link state routing protocol.

Each router running the link state routing protocol maintains an identical link state database (LSDB) describing the topology of the autonomous system (AS). Each individual piece of the LSDB is a particular router's local state, e.g., the router's usable interfaces and reachable neighbors or adjacencies. As used herein, neighboring routers (or "neighbors") are two routers that have interfaces to a common network, wherein an interface is a connection between a router and one of its attached networks. Moreover, an adjacency is a relationship formed between selected neighboring routers for the purpose of exchanging routing information and abstracting the network topology. One or more router adjacencies may be established over an interface.

The adjacencies are established and maintained through the use of a conventional Hello protocol. Broadly stated, the Hello protocol ensures that communication between neighbors is bi-directional by periodically sending Hello packets out all router interfaces. Bi-directional communication is indicated when the router "sees" itself listed in the neighbor's Hello packet. On broadcast and non-broadcast multi-access (NBMA) networks, the Hello protocol elects a designated router (DR) and backup designated router (BDR) for the network.

The infrastructure of a typical router comprises functional components organized as a control plane and a data plane. The control plane includes the functional components needed to manage the traffic forwarding features of the router. These features include routing protocols, configuration information and other similar functions that determine the destinations of data packets based on information other than that contained within the packets. The data plane, on the other hand, includes functional components needed to perform forwarding operations for the packets.

For a single processor router, the control and data planes are typically implemented within the single processor. However, for some high performance routers, these planes are implemented within separate devices of the intermediate node. For example, the control plane may be implemented in a supervisor processor, such as a route processor, whereas the data plane may be implemented within a hardware-assist device, such as a co-processor or a forwarding processor. In other words, the data plane is typically implemented in a specialized piece of hardware that is separate from the hardware that implements the control plane.

The control plane generally tends to be more complex than the data plane in terms of the quality and quantity of software operating on the supervisor processor. Therefore, failures are more likely to occur in the supervisor processor when executing such complicated code. In order to ensure high availability in an intermediate network node, it is desirable to configure the node such that if a failure arises with the control plane that requires restarting and reloading of software executing on the supervisor processor, the data plane continues to operate correctly. Restarting and reloading of control plane software may be necessary because of a failure with the routing protocol process, e.g., an OSPF module, or a software upgrade to the OSPF module. A router that is configured to enable its data plane to continue packet forwarding operations during restart and reload of the control plane software is referred to as a non-stop forwarding (NSF) capable router.

Each router distributes its local state throughout the domain in accordance with an initial LSDB synchronization process and a conventional flooding algorithm. In order to guarantee convergence of a link state routing protocol, it should be ensured that link state protocol data units (PDUs) that originate after an initial LSDB synchronization between neighbors is completed are delivered to all routers within the flooding scope limits. These limits may comprise an area or the entire AS, depending on the protocol and the type of link-state PDU. An area is a collection or group of contiguous networks and nodes (hosts), together with routers having interfaces to any of the included networks. Each area runs a separate copy of the link state routing algorithm and, thus, has its own LSDB. In the case of OSPF, the PDU is a link state advertisement (LSA) packet comprising a unit of data describing the local state of a router or network. The collected PDUs of all routers and networks form the LSDB for the particular link state routing protocol.

Coherency of the LSDB is needed for link state routing protocols, such as OSPF, to correctly calculate routing information. In order for a NSF-capable router to correctly calculate routing information after a reload of its OSPF routing protocol software, it must be able to download LSAs from the neighbors into its LSDB without destroying ("dropping") the adjacencies with those neighbors. An OSPF router typically resynchronizes its LSDB with a neighbor by forcing a finite state machine (FSM) of the neighbor into a particular state, e.g., from a Full state to an ExStart state. The router provides a FSM per neighbor at each of its interfaces and the FSM implements various states of the adjacency between the router and its neighbor.

However, forcing the neighbor FSM into the ExStart state causes the neighbor to do the same action, i.e., transition ("move") the NSF router FSM from the Full state to the ExStart state. This results in dropping of the adjacency between the router and neighbor such that transit data traffic cannot be routed over the corresponding interface of the router. Specifically, when a router moves its neighbor FSM from the Full state to the ExStart state, it no longer considers the adjacency with that neighbor "full". The router then stops listing that adjacency in its LSAs and stops forwarding traffic to the neighbor. In the case of a NSF router, such a situation has severe consequences. That is, if its neighbors were to stop forwarding data traffic to it, the router could no longer function as a NSF-capable router.

Therefore, an object of the invention is to provide a technique that enables a NSF-capable router to efficiently resynchronize its LSDB with that of its neighbors.

Another object of the present invention is to provide a technique that allows a NSF router to resynchronize its LSDB without disturbing the adjacency with its neighbor, i.e., without transitioning the neighbor FSM to the ExStart state.

Yet another object of the present invention is to provide a backward compatible technique that allows a NSF router to resynchronize its LSDB without disturbing the adjacency with its neighbor that was established before a reload of routing protocol software on the router.

SUMMARY OF THE INVENTION

The present invention comprises a technique for resynchronizing a link state database (LSDB) of a non-stop forwarding (NSF) router with the LSDB of a neighbor while maintaining an existing adjacency with the neighbor over a network interface of the router. According to the technique, the NSF router "pretends" to be a new router by establishing a "fake" adjacency with the neighbor over the same interface used for the existing adjacency with the neighbor. Believing that the fake adjacency is an actual adjacency established with the new router, the neighbor does not destroy ("drop") the existing adjacency with the NSF router. That is, the neighbor maintains the existing adjacency with the NSF router. This allows the NSF router to continue receiving and forwarding data traffic over the existing adjacency that was established before, e.g., reloading of routing protocol software on the router.

Specifically, the NSF router resynchronizes its LSDB with its neighbor over the fake adjacency by transitioning a finite state machine (FSM) of the neighbor from, e.g., an ExStart state through an Exchange state to a Full state. To ensure that the neighbor does not request any link state acknowledgement (LSA) packets over the fake adjacency, the NSF router sends an empty database description packet to the neighbor over that adjacency. Upon the neighbor FSM reaching the Full state, the fake adjacency is not reported by the NSF router in a LSA packet, but is rather simply "dropped" by, e.g., the router sending empty Hello packets (or no Hello packets) over the adjacency.

In the illustrative embodiment, the interface may comprise a local area network (broadcast) interface or a point-to-point interface. Where the interface is a broadcast interface, the NSF router uses a secondary router identifier (ID) and a secondary IP address that belongs to the same subnetwork as a primary IP address of the interface. This secondary information may be provisioned and configured by an administrator or dynamically determined by the NSF router, if possible. The NSF router then establishes the fake adjacency with a designated router (DR) or with a backup designated router if the NSF router is the DR on the subnetwork. In either case, the fake adjacency is established using the secondary IP address as the source IP address of a packet and the secondary router ID as the new router ID.

For a point-to-point interface, the technique is generally the same. Yet, it is possible that the technique may not work with some OSPF implementations because those implementations may limit the number of adjacencies to one on a point-to-point link. Nevertheless, a point-to-point interface may have two neighbor data structures at any moment when the router ID of a router at one end of the link changes. The OSPF standard does not prevent establishing more than one adjacency over a point-to-point interface.

BRIEF DESCRIPTION OF THE DRAWINGS

The above and further advantages of the invention may be better understood by is referring to the following description in conjunction with the accompanying drawings in which like reference numbers indicate identical or functionally similar elements.

DETAILED DESCRIPTION OF AN ILLUSTRATIVE EMBODIMENT

Figure 1:
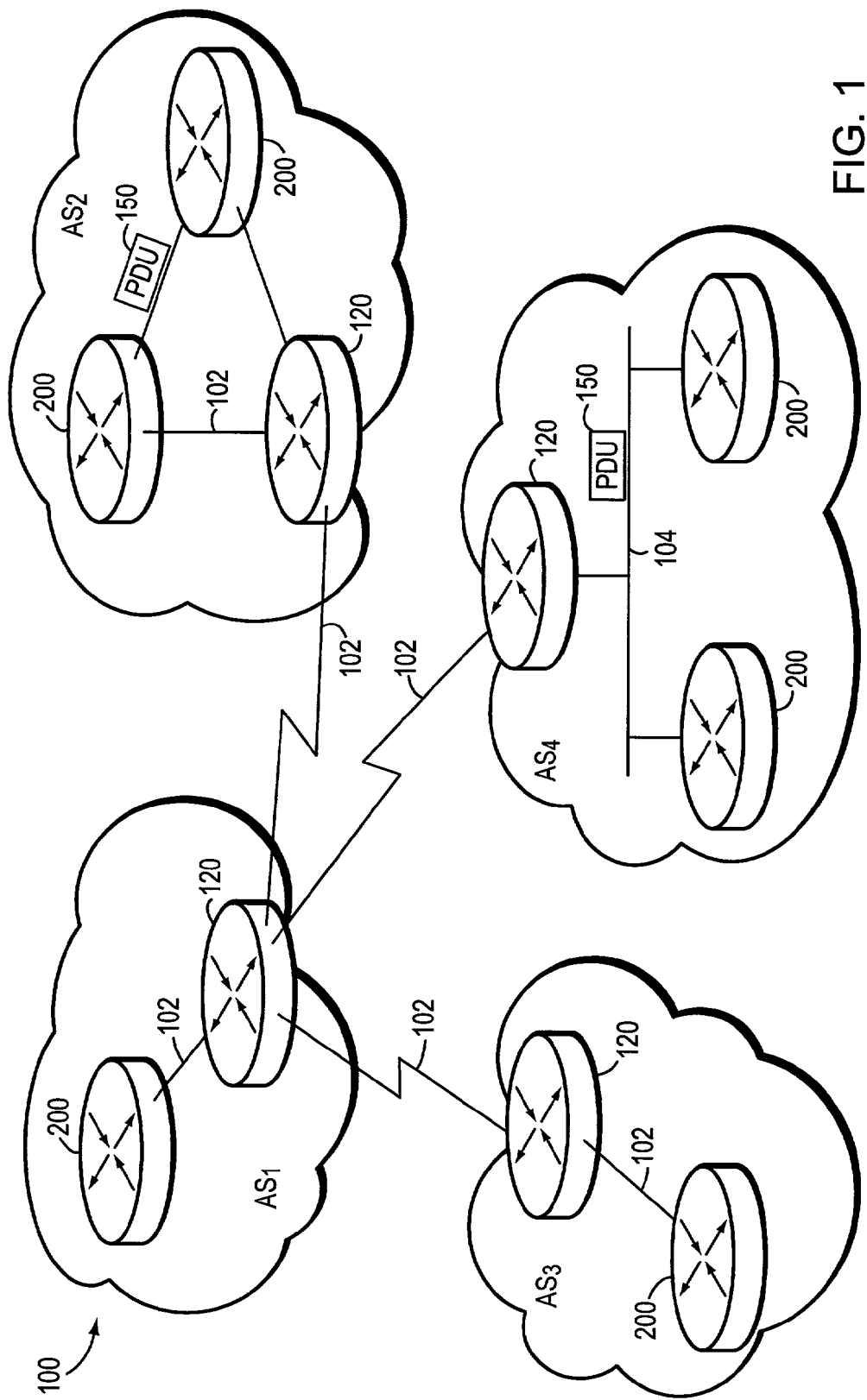
FIG. 1 is a schematic block diagram of a computer network comprising a plurality of autonomous systems or routing domains including intermediate nodes, such as intra-domain routers.

FIG. 1 is a schematic block diagram of a computer network 100 comprising a plurality of routing domains or autonomous systems interconnected by intermediate nodes, such as conventional interdomain routers 120 and intradomain routers 200. The interdomain routers 120 interconnect various autonomous systems (AS$_{1-4}$), whereas the intradomain routers 200 manage communication media and nodes within their respective AS domains. The communication media include shared medium networks 104, such as local area network (LAN) subnetworks, point-to-point links 102 and non-broadcast multi-access (NBMA) clouds such as frame relay or asynchronous transfer node networks. Communication among the routers is typically effected by exchanging discrete data units or packets in accordance with predefined protocols, such as the Transmission Control Protocol/Internet Protocol (TCP/IP). It will be understood to those skilled in the art that other protocols, such as the Internet packet exchange (IPX) protocol and associated link state routing protocols (e.g., NLSP), may be advantageously used with the present invention.

Figure 2:
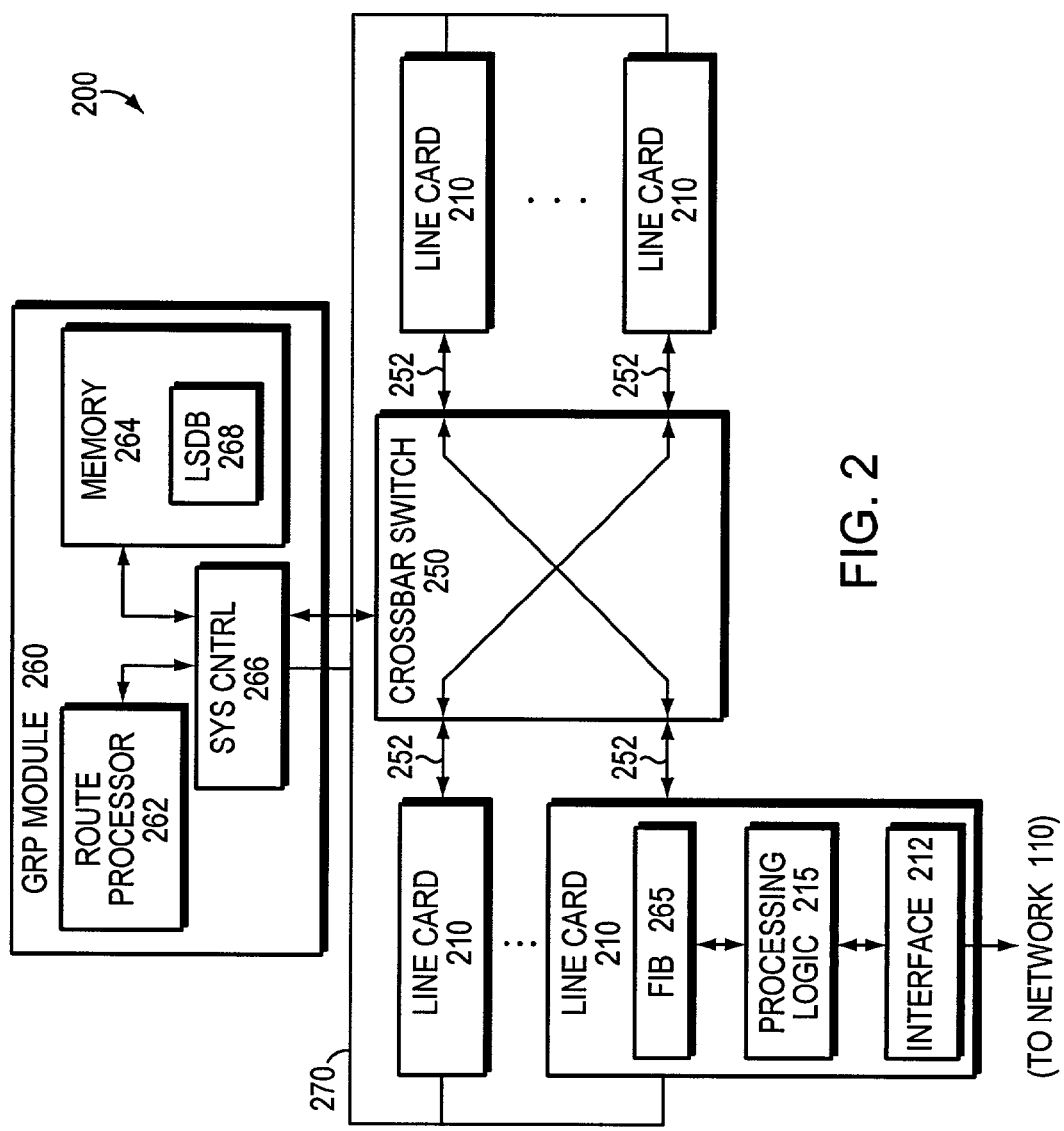
FIG. 2 is a schematic block diagram of a router that may be advantageously used with the present invention.

FIG. 2 is a schematic block diagram of an intradomain router 200. An example of the router 200 that may be illustratively used with the present invention is the GSR 12000 series gigabit switch router (GSR) available from Cisco Systems, Inc. The router 200 is preferably based on a high-speed distributed architecture optimized for routing and packet forwarding functions. To that end, the router comprises a gigabit route processor (GRP) module 260 and a plurality of line cards 210 interconnected by a crossbar switch 250. The crossbar switch 250 is a multi-gigabit crossbar switching fabric configured to provide high-capacity switching operations at gigabit rates among the line cards over point-to-point serial data lines 252. Each line card 210 includes at least one interface 212 comprising circuitry needed to connect the router to a communication medium of the network. Each line card 210 further includes conventional processing logic 215 needed to perform the packet-forwarding functions for the router.

The GRP module 260 is a processor-based, routing system suite comprising functionality incorporated within a typical router. That is, the GRP module comprises a route processor 262 coupled to a memory 264 via a system controller 266. The memory 264 may comprise synchronous dynamic random access memory (SDRAM) storage locations addressable by the processor 262 for storing software programs and data structures described herein. A network routing operating system, portions of which are typically resident in memory and executed by the route processor, functionally organizes the router by, inter alia, invoking network operations in support of software processes executing on the router. It will be apparent to those skilled in the art that other memory means, including various computer readable media, may be used for storing and executing program instructions pertaining to the operation of the router.

The route processor 262 performs configuration management and control functions for the router 200 and communicates with neighboring peer routers to exchange protocol data units (PDUs) used to construct routing tables in accordance with conventional routing algorithms. The route processor also computes and loads forwarding information base (FIB) tables 265 used by the line cards 210. A copy of the FIB tables 265 computed by the route processor 262 is distributed to each line card 210 over a management control bus 270. Each "source" line card performs an independent lookup of a destination address for each incoming packet using a local copy of the FIB table and then forwards the packet over the crossbar switch 250 to a "destination" line card.

The functional infrastructure of the router 200 is preferably divided into a data plane and a control plane. The data plane includes components used to retrieve data packets from the network and provide those packets to forwarding logic of the router (and vice versa). In contrast, the control plane includes those entities used to manage/control traffic forwarding operations of the router. In the illustrative embodiment, the infrastructure of the router includes distributed processing logic 215 configured to perform packet forwarding operations and physical port interfaces 212 resident on the line cards 210 that do not have direct access to the route processor 262 over the data plane. This infrastructure allows the router to continue performing traffic forwarding operations throughout the data plane in the presence of a failure or software reload within the control plane. In essence, the infrastructure enables the intradomain router 200 to function as a non-stop forwarding (NSF) capable router.

Figure 3:
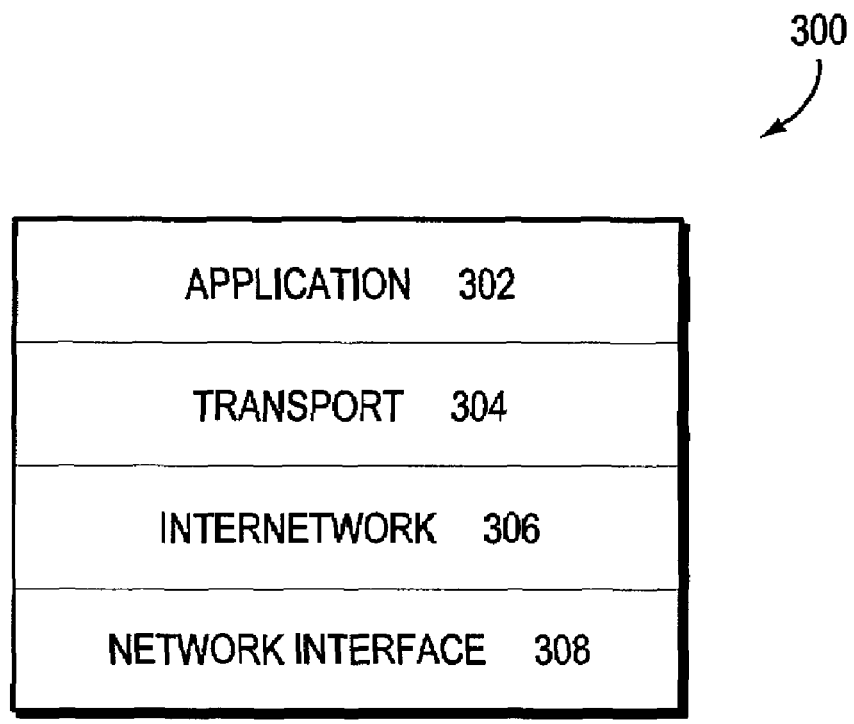
FIG. 3 is a schematic block diagram of a conventional protocol stack, such as the Internet communications protocol stack, within the router of FIG. 2.

A key function of the router is determining the next node to which a packet is sent; in order to accomplish such "routing" the routers cooperate to determine optimal paths (i.e., "best links") through the computer network 100. The routing function is preferably performed by an internetwork layer of a conventional protocol stacked within each router. FIG. 3 is a schematic block diagram of a conventional protocol stack, such as the Internet communications protocol stack 300. The architecture of the Internet protocol stack 300 is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the Internet protocol (IP). IP is primarily a connectionless protocol that provides internetwork routing, fragmentation and assembly of exchanged packets—generally referred to as "datagrams" in an Internet environment—and which relies on transport protocols for end-to-end reliability. An example of such a transport protocol is the Transmission Control Protocol (TCP) which is implemented by the transport layer 304 and provides connection-oriented services to the upper layer protocols of the Internet architecture. The term TCP/IP is commonly used to denote the Internet architecture.

In particular, the internetwork layer 306 concerns the protocol and algorithms that the routers 200 utilize so that they can cooperate to calculate paths through the computer network 100. An intradomain protocol may be used to perform intradomain routing (for the Internetwork layer) within each AS of the computer network 100. An example of a protocol used to distribute routing information between neighboring routers belonging to a single AS is the Open Shortest Path First (OSPF) link state routing protocol. The OSPF routing protocol is well known and described in detail in *Request for Comments* (*RFC*) 2328, *OSPF version* 2, by J. Moy (1998) and *Interconnections, Second Edition* by R. Perlman, published by Addison Wesley Publishing company (2000).

In a link state routing protocol, each intradomain router maintains a link state database (LSDB 268, shown in FIG. 2) and each participating intradomain router has an identical LSDB. Each individual piece of the LSDB is a particular router's local state (e.g., the router's usable interfaces and reachable neighbors) that is distributed by the router throughout the AS in accordance with a flooding algorithm.

The reachable neighbors (e.g., other intradomain routers 200 within $AS_{2,4}$ of FIG. 1) are associated with the intradomain router through an adjacency relationship that enables the exchange of routing information between the routers. This adjacency relationship is established and maintained using a conventional Hello protocol defined by the OSPF routing protocol.

Figure 4:
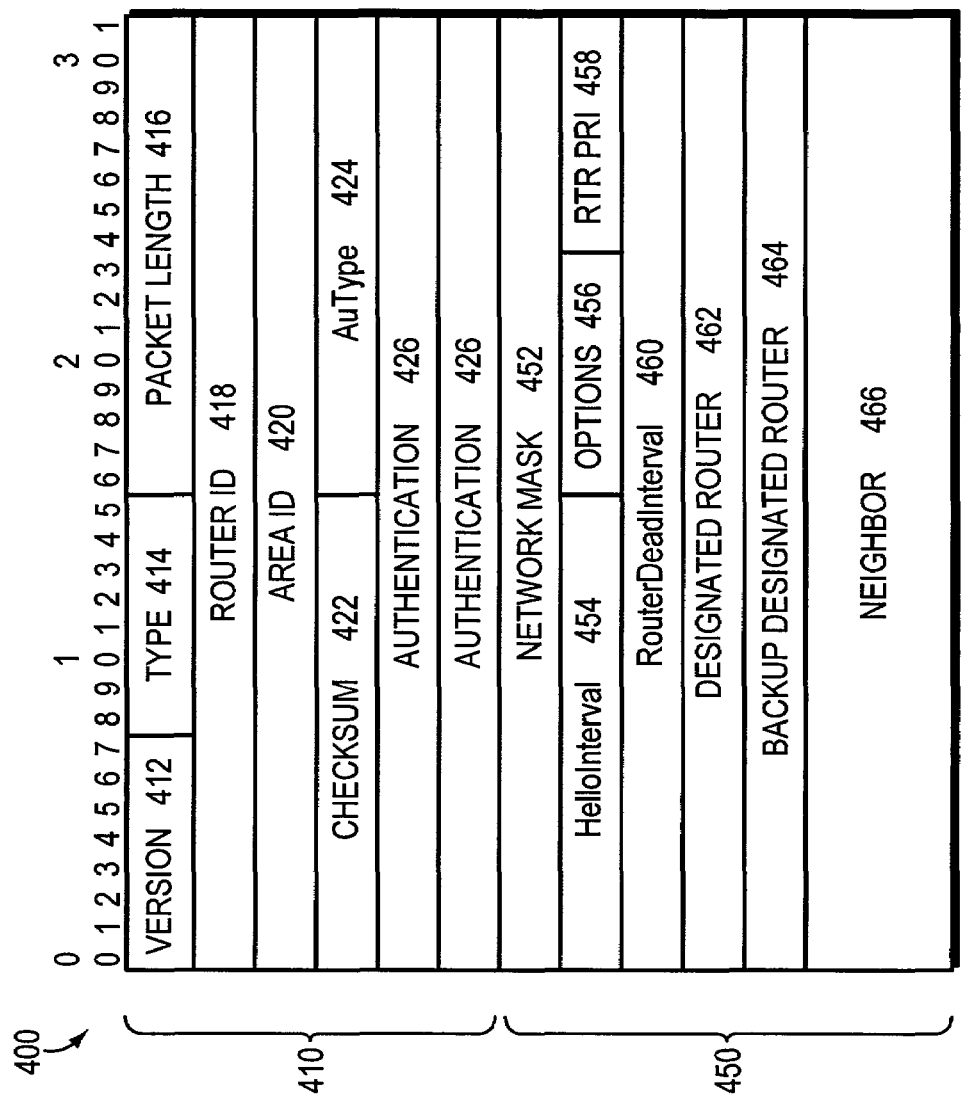
FIG. 4 is a schematic block diagram depicting the format of a Hello packet that may be advantageously used with the present invention.

FIG. 4 is a schematic block diagram depicting the format of a conventional Hello packet 400 comprising an OSPF packet header 410 and Hello-specific packet fields 450. All OSPF packets are encapsulated within IP packets and each OSPF packet, such as a Hello packet, starts with a standard 24-byte OSPF header 410. The header contains information needed to determine whether the packet should be accepted for further processing. The Hello packet is an OSPF type 1 packet that is periodically sent over interfaces of the router to establish and maintain neighbor adjacencies. All routers connected to a common network must agree on certain parameters, such as HelloInterval and RouterDeadInterval, included in the Hello packet. It should be noted that disagreement over these parameters may inhibit the forming of the neighbor adjacencies.

The OSPF packet header 410 includes a version field 412 containing the OSPF version number, a type field 414 containing the type of OSPF packet and a packet length field 416 including the length of the OSPF protocol packet in bytes. The header 410 also includes a router ID field 418 containing the router identifier (ID) of the source of the packet and an area ID field 420 whose contents identify the area to which the packet belongs. A checksum field 422 containing a standard IP checksum of the entire contents of the packet, starting with the OSPF packet header but excluding a 64-bit authentication field. An authentication type (AuType) field 424 identifies the authentication procedure to be used for the packet and authentication field 426 contains a 64-bit value for use by the authentication scheme.

The Hello-specific packet fields 450 include a network mask field 452 identifying the network mask associated with the particular router interface. A HelloInterval field 454 contains a value representing the number of seconds between Hello packets issued by the router, while an options field 456 identifies optional capabilities supported by the router. A router priority value is contained in a router priority (Rtr Pri) field 458 and a RouterDeadInterval field 460 includes a value (i.e., an "inactivity timer") indicating the number of seconds before declaring a silent router down. A designated router field 462 identifies the designated router (DR) for the network, whereas a backup designated router field 464 identifies the backup designated router (BDR) for the network. Lastly, a neighbor field 466 contains the router ID of each router from whom valid Hello packets have been recently received over the network.

When a NSF-capable router reloads its routing software (e.g., OSPF routing protocol software module) it does not actively send Hello packets since it does not know its neighbors. If the router sends Hello packets that do not contain the router IDs of the neighbors, those neighbors destroy the existing adjacencies. To avoid such a situation, it is desirable to make an OSPF routing module reload sequence transparent to the NSF router's neighbors. To that end, a technique is provided that maintains those existing adjacencies between the NSF router and its neighbors during reload of a new instance of the OSPF software. An example of such a technique is disclosed in co-pending and commonly-assigned U.S. Patent Application serial number (112025-0453) titled, *Technique for Restoring Adjacencies in OSPF in a Non-Stop Forwarding Intermediate Node of a Computer Network*, which application is hereby incorporated by reference as though fully set forth herein.

Figure 5:
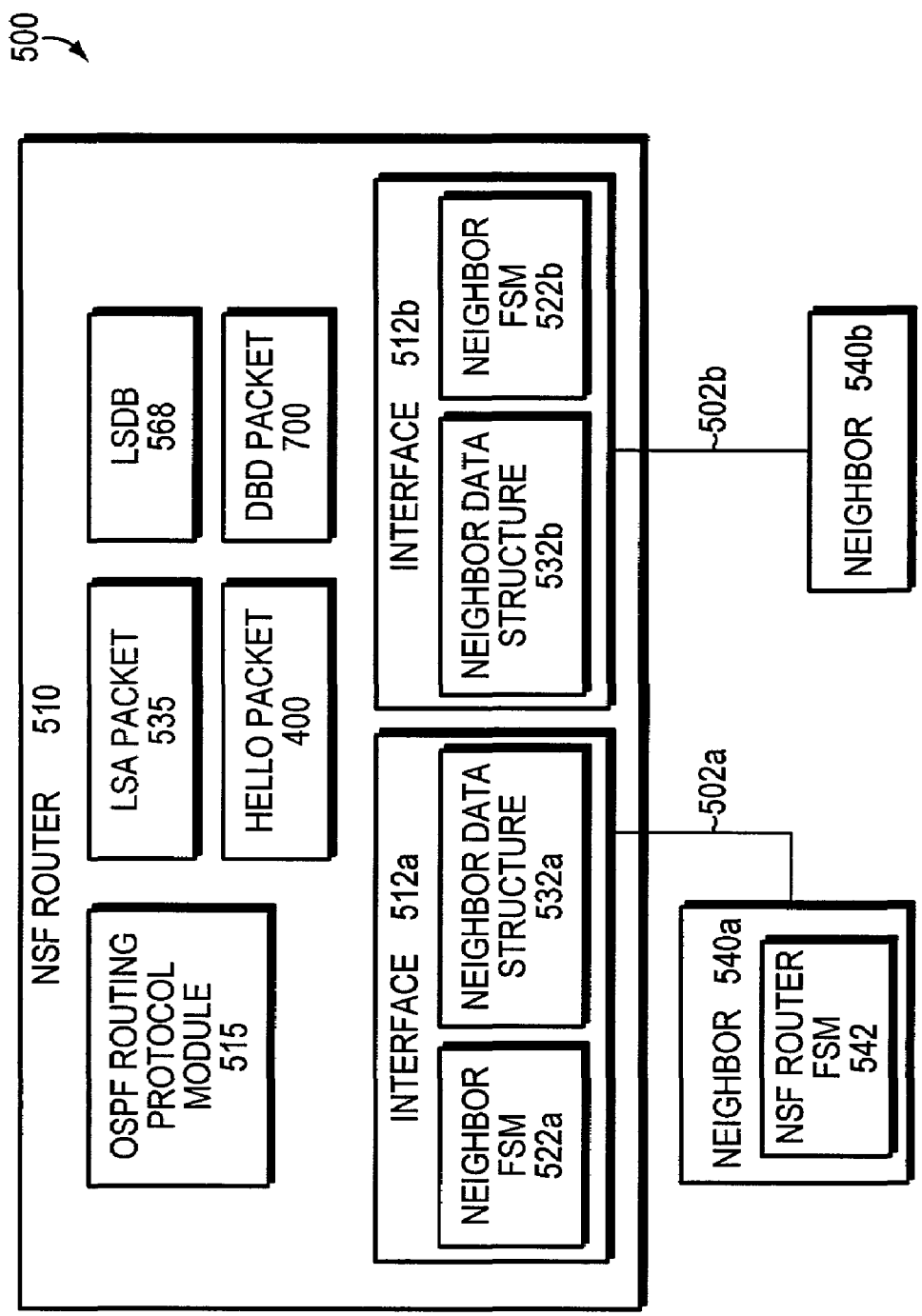
FIG. 5 is a schematic block diagram of a network configuration having adjacencies between the router and its neighbors.

FIG. 5 is a schematic block diagram of a network configuration 500 having adjacencies 502a,b between a NSF router 510 and its neighbors 540a,b over a broadcast interface 512a and a point-to-point interface 512b of the router. Assume an OSPF routing module 515 of the NSF router is reloaded and the router has "picked up" the adjacencies 502a,b with its neighbors using, e.g., the technique described above such that the router "knows" all of its previous neighbors. The router then requests all link state advertisement (LSA) packets 535 from its neighbors because its LSDB 568 is in a re-initialized "empty" condition due to the reloading/restarting of the OSPF software. The format of the LSA packet is well known and described in *RFC* 2328. Thus, an LSDB resynchronization sequence is performed to resynchronize the router LSDB with that of its neighbor. To initiate resynchronization of its LSDB with each neighbor LSDB, a router typically places a conventional finite state machine (FSM 522a,b) associated with each neighbor in a particular state, e.g., an ExStart state.

Figure 6:
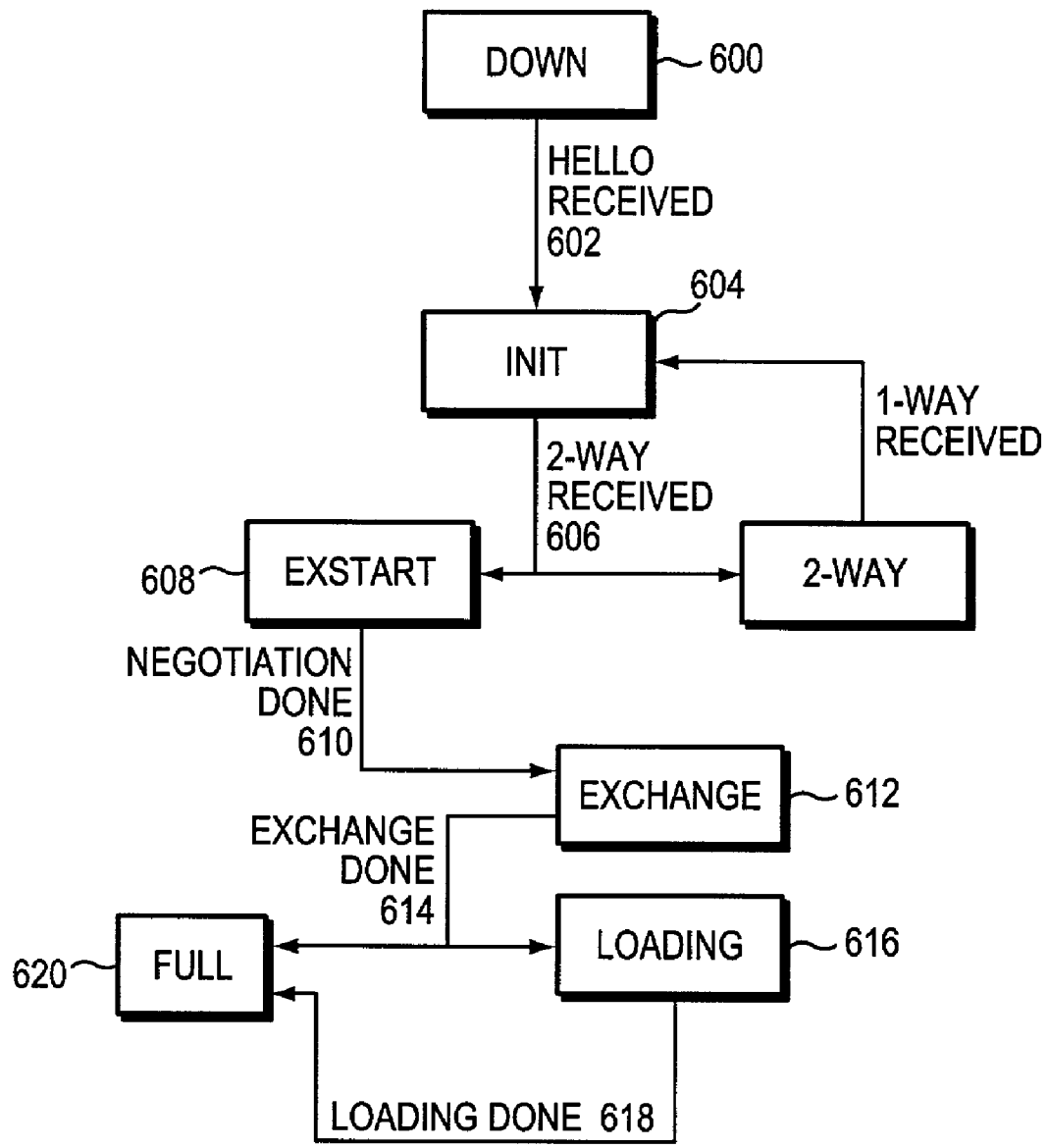
FIG. 6 is a state diagram illustrating various states of a finite state machine associated with a neighbor of the router.

FIG. 6 is a state diagram illustrating various states of the neighbor as provided by a neighbor FSM. The ExStart state 608 represents the first step in creating an adjacency that allows an OSPF process executing on a neighbor to send initial database description (DBD) packets 700 to the router. DBD packets are OSPF type 2 packets that are exchanged when an adjacency is being initialized. A DBD packet 700 describes the contents of the LSDB and typically multiple DBD packets are used to describe the LSDB. For this purpose, a poll-response procedure is used wherein one of the routers is designated a master and the other is designated a slave. The master sends DBD packets (polls) which are acknowledged by DBD packets sent by the slave (responses). The responses are linked to the polls via DD sequence numbers of the packets.

Figure 7:
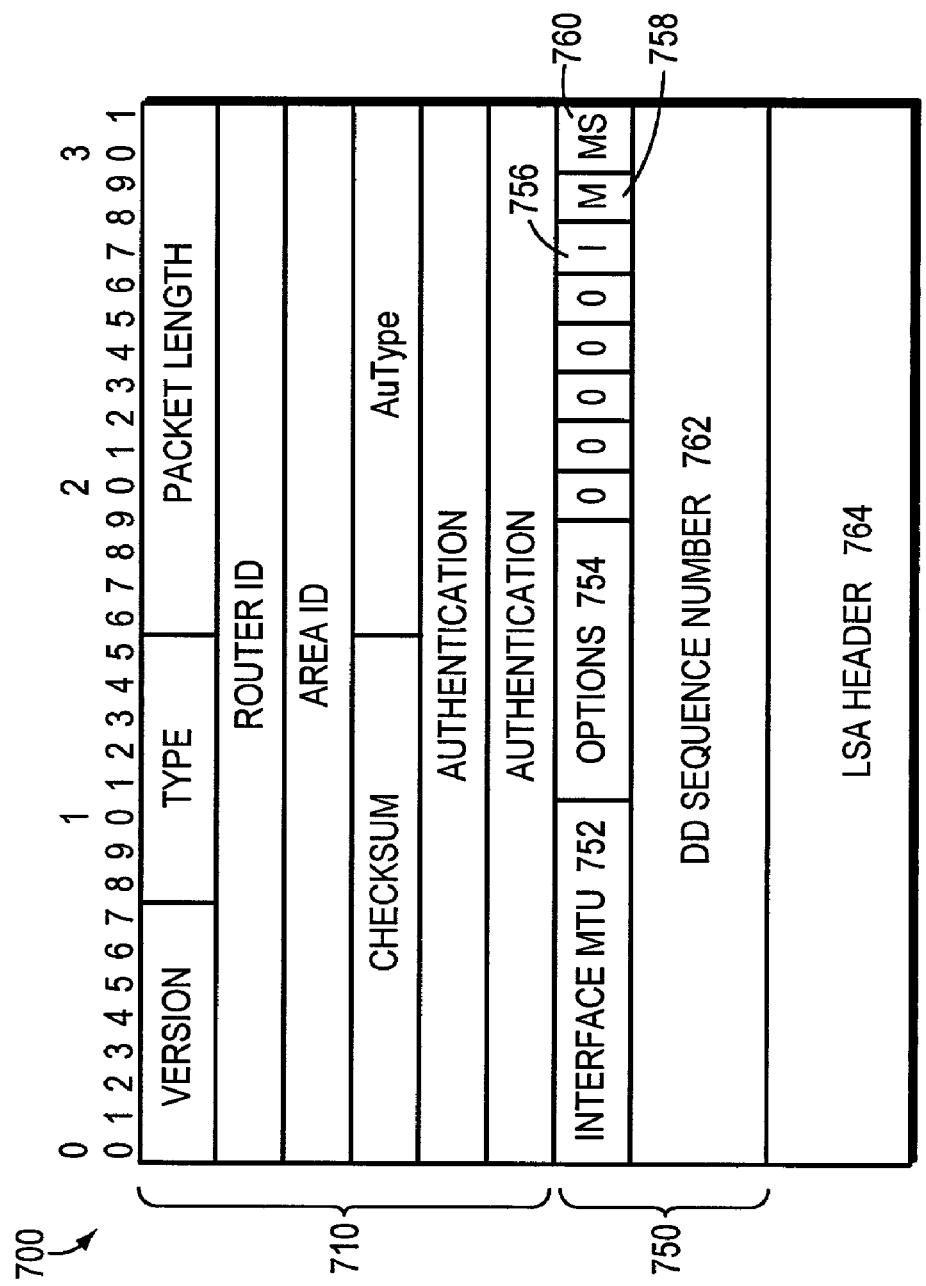
FIG. 7 is a schematic block diagram depicting the format of a database description packet that may be advantageously used with the present invention.

FIG. 7 is a schematic block diagram depicting a DBD packet 700 that may be advantageously used with the present invention. The DBD packet 700 includes an OSPF header 710 similar to the OSPF 410 of the Hello packet 400. In addition, the DBD packet comprises DBD-specific packet fields 750, including an interface MTU field 752 containing the size in bytes of the largest IP datagram that can be sent out the associated interface without fragmentation. The fields 750 also include an options field 754 that identifies optional capabilities supported by the router, and various bit fields (I-bit 756, M-bit 758 and MS-bit 760). A DD sequence number field 762 is used to sequence the collection of DBD packets, while an LSA header field 764 contains a list of link-state database pieces, as identified by LSA headers.

Referring to again FIGS. 5 and 6, assume the NSF router 510 has not yet received any Hello packets 400 from neighbor 540a over broadcast interface 512a. A neighbor data structure 532a is created for neighbor 540a when a first incoming Hello packet is received at the NSF router from neighbor 540a. The neighbor FSM 522a then moves from a Down state 600 to an Init state 604. The neighbor FSM 522a remains in this state until the neighbor 540a lists the NSF router 510 in its Hello packets. The event HelloReceived 602 indicates reception of a Hello packet that may or may not list the NSF router. When the NSF router receives an incoming Hello packet from neighbor 540a that contains its (the NSF router's) router ID, it implies that the NSF router has also listed neighbor 540a in the Hello packets it sends over the interface 512a.

Once the neighbor data structure 532a is created for neighbor 540a, the NSF router sends Hello packets 400 with neighbor 540a listed in the packets. This same sequence occurs with the remote neighbor 540a. Upon the NSF router receiving an incoming Hello packet 400 from neighbor 540a with the NSF router's ID listed in the packet, there is 2-way communication between the router 510 and neighbor 540a. This condition is needed to generate a 2-Way Received event 606, which transitions the neighbor FSM 522a from the Init state 604 to, e.g., the ExStart state 608.

In the ExStart state 608, the NSF router 510 begins LSDB synchronization with its neighbor 540a. That is, the router and neighbor negotiate as to the master/slave status of each router and as to the intitial sequence number for the DBD packets to be exchanged. Upon completion of negotiation (Negotiation Done 610), the neighbor FSM 522a transitions to an Exchange state 612 where the DBD packets 700 are received, i.e., where the neighbor reliably exchanges its database description with the router. Once the DBD packets 700 are reliably exchanged (Exchange Done 614), it is known which, if any, LSA packets 535 are still needed from the neighbor X. If any LSA packets are needed, the neighbor FSM 522a transitions to a Loading state 616 where the needed packets are requested. Once the list of requested LSA packets is empty or there are no further LSA packets requested (Loading Done 618), the neighbor FSM 522a transitions to a Full state 620.

After reaching the Full state, if the NSF router receives an initial DBD packet 700 from neighbor 540a, it forces its neighbor FSM 522a back to the ExStart state 608. This may indicate that routing software on neighbor 540a has been restarted/reloaded and that neighbor 540a has received a Hello packet 400 from the NSF router listing neighbor 540a. However, forcing the neighbor FSM 522a into the ExStart state 608 causes the neighbor 540a to do the same action, i.e., transition ("move") its neighbor (i.e., NSF router) FSM 542 from the Full state 620 to the ExStart state 608. This results in destroying ("dropping") of the adjacency 502a between the NSF router 510 and neighbor 540a such that transit data traffic cannot be forwarded over the corresponding interface 512a of the router 510. Such a situation prevents the router 510 from functioning as a NSF-capable router. The present invention is directed to a technique that allows a NSF router to resynchronize its LSDB without disturbing the adjacency with its neighbor, i.e., without transitioning the neighbor FSM to the ExStart state.

Specifically, the present invention comprises a technique for resynchronizing the LSDB of a NSF router with the LSDB of a neighbor while maintaining an existing adjacency with the neighbor over a network interface of the router. According to the technique, the NSF router "pretends" to be a new router by establishing a "fake" adjacency is with the neighbor over the same interface used for an existing "real" adjacency with the neighbor. NSF router simulates the new router in a backward compatible manner, i.e., in a manner that does not require additional functionality in neighbor. It should be noted that the term "fake" is used from the perspective of the NSF router and not from that of the neighbor, which perceives the adjacency as real.

Figure 8:
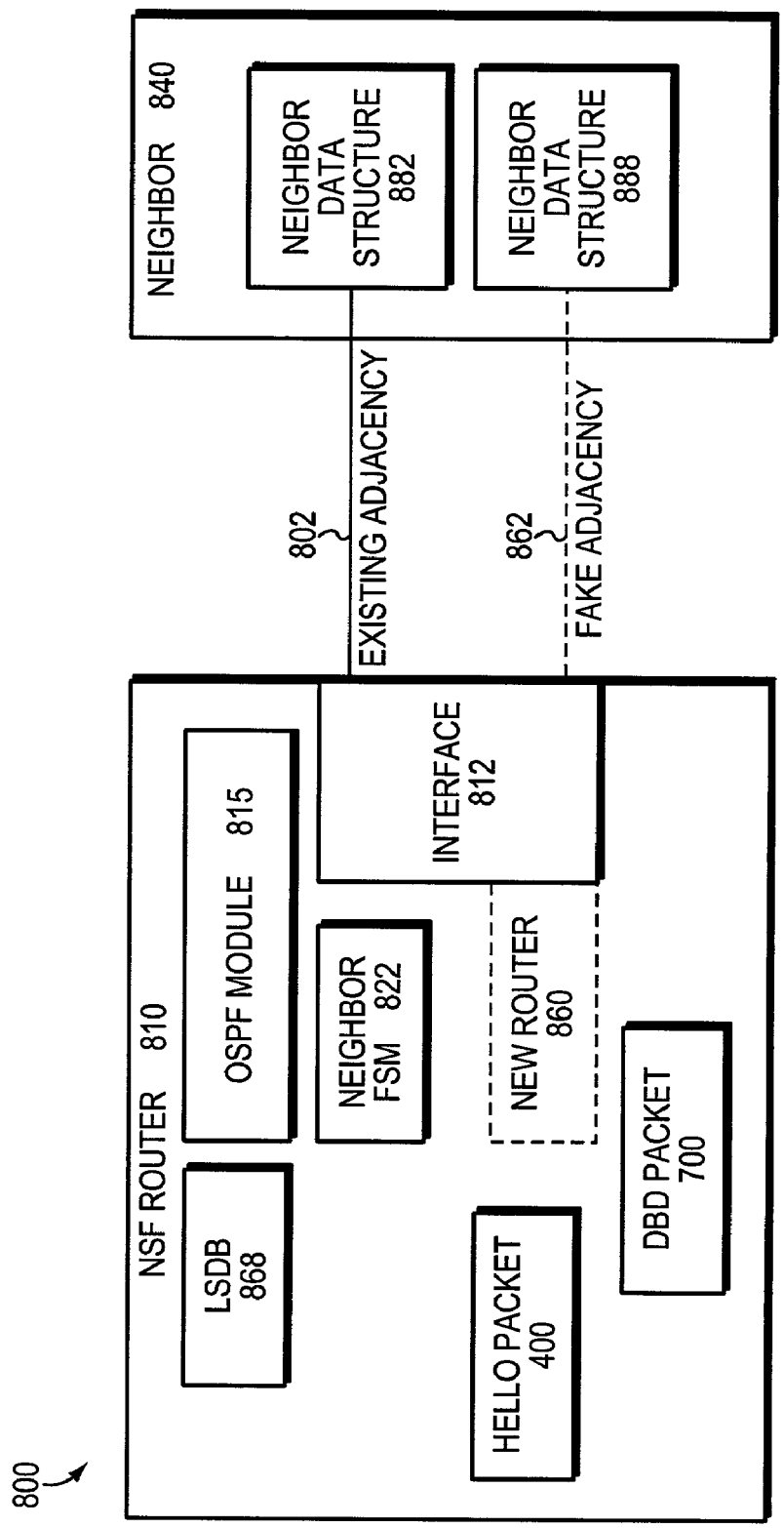
FIG. 8 is a schematic block diagram of a network configuration depicting the resynchronization technique in accordance with the present invention.

FIG. 8 is a schematic block diagram of a network configuration 800 depicting the resynchronization technique in accordance with the present invention. Here, a NSF router 810 pretends to be a new router (shown at 860) by establishing a fake adjacency 862 with a neighbor 840 over an interface 812 that is also used for an existing ("real") adjacency 802 with the neighbor. As described herein, the fake adjacency 862 is used to exchange the contents of LSDB 868 between the neighbor and NSF router. Believing that the fake adjacency is an actual adjacency established with the new router 860, the neighbor 840 does not destroy the existing adjacency 802 with the NSF router 810. This allows the NSF router to continue receiving and forwarding data traffic over the existing adjacency 802 that was established before, e.g., reloading of routing protocol software on the router.

More specifically, the NSF router resynchronizes its LSDB 868 with its neighbor over the fake adjacency 862 by transitioning a neighbor FSM 822 from, e.g., the ExStart state 604 through the Exchange state 606 to the Full state 610. To ensure that the neighbor 840 does not request any LSA packets over the fake adjacency 862, the NSF router 810 sends an empty DBD packet 700 to the neighbor over that adjacency. Note that an empty DBD packet 700 does not contain any LSA headers in LSA header field 764. Upon the neighbor FSM 822 reaching the Full state 610, the fake adjacency 862 is not reported by the NSF router 810 in a LSA packet, but is rather simply "dropped" by, e.g., the router sending empty Hello packets 400 (or no Hello packets) over the adjacency 862. By sending no Hello packets, the adjacency 862 is destroyed in, e.g., 40 seconds. An empty Hello packet 400 does not contain any neighbor router IDs in the neighbor field 466.

It should be noted that there may be separate neighbor data structures (and FSMs) for the adjacency between the NSF router and neighbor, and the adjacency between the new router and neighbor; furthermore, each neighbor data structure may have a flag denoting a "fake" adjacency. It should also be noted that the interface data structure may be shared between the "separate" routers. However, in an alternate embodiment, a "fake" interface may be created that is linked to the fake adjacency. This latter embodiment automatically excludes the "fake" neighbor data structure from DR election on the "real" interface. The fake interfaces/adjacencies are "skipped" during the LSA origination process and, consequently, no state changes for fake adjacencies should trigger LSA re-origination.

In the illustrative embodiment, the interface 812 may comprise a broadcast (e.g., local area network) interface or a point-to-point interface. Where the interface is a broadcast interface, such as an Ethernet interface, the NSF router should have a secondary router ID and a secondary IP address on that interface. The secondary IP address must belong to the same subnetwork as the primary IP address of the interface. The NSF router may use the secondary IP address as the new router ID and IP interface address when establishing the fake adjacency 862 with the neighbor. Alternatively, the fake adjacency may be established using the secondary IP address as the source IP address of a packet and the secondary router ID as the new router ID. This secondary information may be provisioned and configured by an administrator or dynamically determined by the NSF router, if possible. The NSF router then establishes the fake adjacency with a designated router (DR) or with a backup designated router if the NSF router is the DR on the subnetwork.

For example, assume the NSF router 810 sends Hello packets 400 to neighbor 840 as both the NSF router and as a new router 860 over the broadcast interface. When neighbor 840 receives Hello packets from the new router, it creates a neighbor data structure 888 for the fake adjacency 862. Neighbor 840 then proceeds with the LSDB synchronization process with new router 860. The existing adjacency 802 remains intact, despite reload of an OSPF module 815 in the NSF router 810 as the fake adjacency 862 finishes resynchronization of the LSDB 868. Once the synchronization process completes on all interfaces belonging to the same area, the NSF router "announces" the adjacencies it had before reloading the OSPF software 815, including the existing adjacency 802. At this point, the neighbor 840 "sees" (realize) two adjacencies: the existing and fake adjacencies. When the fake adjacency 862 completes the LSDB synchronization process, neighbor 840 places its adjacency 862 to the Full state 610 as its existing adjacency 802 remains in the Full state.

Specifically, before the NSF router restarts, neighbor 840 has only one adjacency, the existing adjacency 802. When the NSF router restarts, there is no LSDB exchange activity on the existing adjacency and, after the NSF router restarts, the NSF router "picks up" the existing adjacency and there is no activity over that adjacency. The NSF router then "pretends" to be new router 860 and the fake adjacency 862 is established. Thereafter, the LSDBs are exchanged and the FSMs transition to Full states. The NSF router then becomes fully adjacent (i.e., fully synchronized) with neighbor 840 and the NSF router then proceeds to "drop" the fake adjacency. Essentially, the adjacency may be dropped by destroying the neighbor data structure.

For a point-to-point interface, a router may have two adjacencies on the same interface. This allows the NSF router to implement the same inventive technique as described on the broadcast interface, e.g., establish a second fake adjacency 862 with neighbor 840. As noted, an object of the invention is to enable neighbor 840 to continue announcing adjacencies with the NSF router 810 despite reloading of routing protocol (OSPF) software 815 at the router. For point-to-point interface, there may be a potential problem when neighbor 840 "learns" of the fake adjacency 862. That is, neighbor 840 may list the fake adjacency 862 before the existing adjacency 802 in its interface data structure. Thereafter, when it constructs its router-LSA 535, neighbor 840 may only place the first listed adjacency in the router LSA (and not the existing adjacency).

However, neighbor 840 originates the new version of the LSA only when that adjacency goes to the Full state. Therefore, the problem can be solved by ensuring that the NSF router always lists the real adjacency in the router-LSA and that the FSM on the other side of the fake adjacency never proceeds to the Full state by not completing the LSDB exchange process. That is, the NSF router should not send the last DBD packet; instead, when the last packet should be sent, it should send an empty DBD packet with the M-bit set. A new version of the LSA may also be originated when another adjacency goes to or from the Full state. This situation (which is not addressed by the present invention) may arise if the network is experiencing a double failure, e.g., the NSF router is reloading and another adjacency has been disturbed.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for resynchronizing a link state database (LSDB) of a non-stop forwarding (NSF) router with a LSDB of a neighbor while maintaining an existing adjacency with the neighbor over an interface of the NSF router that was established before a software reload on the NSF router, the method comprising the steps of:

establishing a fake adjacency with the neighbor over the interface of the NSF router used for the existing adjacency with the neighbor;

maintaining the existing adjacency between the NSF router and the neighbor over the interface; and allowing the NSF router to continue receiving and forwarding data packet traffic over the existing adjacency.

2. The method of claim 1 further comprising the step of using the fake adjacency to exchange the LSDB between the neighbor and NSF router.

3. The method of claim 1 further comprising the steps of:

transitioning a finite state machine (FSM) of the neighbor from an ExStart state to a Full state;

sending an empty database description packet from the NSF router to the neighbor over the fake adjacency to ensure that the neighbor does not request any link state acknowledgement packets over the fake adjacency; and upon the neighbor FSM reaching the Full state, dropping the fake adjacency.

4. The method of claim 3 wherein the step of dropping comprises the step of sending one of empty Hello packets and no Hello packets from the NSF router over the fake adjacency.

5. The method of claim 4 wherein the interface is a broadcast interface and wherein the step of establishing comprises the step of using a secondary router identifier (ID) of the NSF router as a new router ID and a secondary Internet protocol (IP) address of the NSF router as a source IP address of a packet.

6. The method of claim 5 further comprising the steps of:

sending Hello packets from the NSF router to the neighbor as both the NSF router and as a new router over the broadcast interface;

creating a neighbor data structure for the fake adjacency at the neighbor in response to receiving Hello packets from the new router;

synchronizing the LSDBs between the neighbor and new router; and realizing the existing and fake adjacencies at the neighbor.

7. Apparatus for resynchronizing a link state database (LSDB) of a non-stop forwarding (NSF) router with a LSDB of a neighbor while maintaining an existing adjacency with the neighbor over an interface of the NSF router that was established before a software reload on the NSF router, the apparatus comprising:

means for establishing a fake adjacency with the neighbor over the interface of the NSF router used for the existing adjacency with the neighbor;

means for maintaining the existing adjacency between the NSF router and the neighbor over the interface; and means for allowing the NSF router to continue receiving and forwarding data packet traffic over the existing adjacency.

8. The apparatus of claim 7 further comprising means for exchanging the LSDB between the neighbor and NSF router.

9. The apparatus of claim 7 further comprising:

means for transitioning a finite state machine (FSM) of the neighbor from an ExStart state to a Full state;

means for sending an empty database description packet from the NSF router to the neighbor over the fake adjacency to ensure that the neighbor does not request any link state acknowledgement packets over the fake adjacency; and upon the neighbor FSM reaching the Full state, means for dropping the fake adjacency.

10. The apparatus of claim 9 wherein the means for dropping comprises means for sending one of empty Hello packets and no Hello packets from the NSF router over the fake adjacency.

11. The apparatus of claim 10 wherein the interface is a broadcast interface.

12. The apparatus of claim 11 further comprising:
means for sending Hello packets from the NSF router to the neighbor as both the NSF router and as a new router over the broadcast interface;
means for creating a neighbor data structure for the fake adjacency at the neighbor in response to receiving Hello packets from the new router; and
means for synchronizing the LSDBs between the neighbor and new router.

13. A computer readable medium containing executable program instructions for resynchronizing a link state database (LSDB) of a non-stop forwarding (NSF) router with a LSDB of a neighbor while maintaining an existing adjacency with the neighbor over an interface of the NSF router that was established before a software reload on the NSF router, the executable program instructions comprising program instructions for:
establishing a fake adjacency with the neighbor over the interface of the NSF router used for the existing adjacency with the neighbor;
maintaining the existing adjacency between the NSF router and the neighbor over the interface; and
allowing the NSF router to continue receiving and forwarding data packet traffic over the existing adjacency.

14. The computer readable medium of claim 13 further comprising program instructions for using the fake adjacency to exchange the LSDB between the neighbor and NSF router.

15. The computer readable medium of claim 13 further comprising program instructions for:
transitioning a finite state machine (FSM) of the neighbor from an ExStart state to a Full state;
sending an empty database description packet from the NSF router to the neighbor over the fake adjacency to ensure that the neighbor does not request any link state acknowledgement packets over the fake adjacency; and
upon the neighbor FSM reaching the Full state, dropping the fake adjacency.

16. The computer readable medium of claim 15 wherein the program instruction for dropping comprises the program instruction for sending one of empty Hello packets and no Hello packets from the NSF router over the fake adjacency.

17. The computer readable medium of claim 16 wherein the interface is a broadcast interface and wherein the program instruction for establishing comprises the program instruction for using a secondary router identifier (ID) of the NSF router as a new router ID and a secondary Internet protocol (IP) address of the NSF router as a source IP address of a packet.

18. The computer readable medium of claim 17 further comprising program instructions for:
sending Hello packets from the NSF router to the neighbor as both the NSF router and as a new router over the broadcast interface;
creating a neighbor data structure for the fake adjacency at the neighbor in response to receiving Hello packets from the new router;
synchronizing the LSDBs between the neighbor and new router; and
realizing the existing and fake adjacencies at the neighbor.

* * * * *